United States Patent [19]
Toyota

[11] Patent Number: 6,121,208
[45] Date of Patent: Sep. 19, 2000

[54] ROLLING SLIDING PART

[75] Inventor: Hiroshi Toyota, Osaka, Japan

[73] Assignee: Koyo Seiko Co., Ltd., Osaka, Japan

[21] Appl. No.: 09/125,175

[22] PCT Filed: Apr. 22, 1997

[86] PCT No.: PCT/JP97/01374

§ 371 Date: Aug. 11, 1998

§ 102(e) Date: Aug. 11, 1998

[87] PCT Pub. No.: WO97/40282

PCT Pub. Date: Oct. 30, 1997

[30] Foreign Application Priority Data

Apr. 25, 1996 [JP] Japan .................................. 8-104984
Sep. 30, 1996 [JP] Japan .................................. 8-259076

[51] Int. Cl.[7] .................... C10M 147/02; C10M 147/04
[52] U.S. Cl. .......................................... 508/106; 508/181
[58] Field of Search ................................ 508/181, 106

[56] References Cited

U.S. PATENT DOCUMENTS

| | | | |
|---|---|---|---|
| 4,847,135 | 7/1989 | Braus et al. | 508/106 |
| 5,131,674 | 7/1992 | Tokui et al. | 280/610 |
| 5,571,779 | 11/1996 | Kleiner | 508/153 |
| 5,939,363 | 8/1999 | Toyota et al. | 508/106 |

FOREIGN PATENT DOCUMENTS 63-76908A  4/1988  Japan .
4-46219A   2/1992  Japan .

*Primary Examiner*—Margaret Medley
*Assistant Examiner*—Cephia D. Toomer

[57] ABSTRACT

A rolling sliding part is in relative rolling contact or sliding contact with a companion member, and is formed on a contact surface thereof with a lubricating film (5) composed of a polymer which contains fluorine with a functional group and in which particles (6) of polytetrafluoroethylene resin are dispersed and mixed. The lubricating film (5) exhibits a favorable lubricating property and generates little dust, and the particles (6) mixed in the film provide a favorable cushioning action under Loading. As the lubricating film (5) itself and the particles (6) are fluorine based, they provide for a good compatibility therebetween.

11 Claims, 4 Drawing Sheets

(a) ~~~X-Y-Y-X~~~X-Y-Y-X~~~X-Y-Y-X~~~

(b)

1

ROLLING SLIDING PART

This application is the national phase under 35 U.S.C. §371 of prior PCT International Application No. PCT/JP97/01374 which has an International filing date of Apr. 22, 1997 which designated the United States of America, the entire contents of which are hereby incorporated by reference.

TECHNICAL FIELD

The present invention relates to a rolling sliding part which is in relative rolling contact or sliding contact with a companion member. As this rolling sliding part, for example, structural elements such as a rolling bearing, a ball screw and a direct-acting bearing are mentioned.

TECHNICAL BACKGROUND

A contact surface of a rolling sliding part has been so far coated with soft metals such as gold, silver, lead and copper or solid lubricants such as carbon and molybdenum disulfide in the form of a film. It has been, however, considered that in this film, dust is generated in a large amount and a loading resistance is low. Meanwhile, a film formed of a polytetrafluoroethylene (hereinafter abbreviated as "PTFE") resin has been used which generates little dust and exhibits a high loading resistance. This film is formed in a solid state. Further, the present applicant has proposed a lubricating film which is formed of a fluorine-containing polymer with a functional group and which is superior to the above-mentioned film with respect to dust generation and a lubricating property. This lubricating film can be rendered in a state of a flowable liquid or in a solid state of a high molecular weight. It is, however, indicated that when such a lubricating film is rendered in a solid state, it is softer than the above-mentioned PTFE, decreasing a loading resistance. When this film is rendered in a liquid state, it has a better loading resistance than the solid film, but this loading resistance is a bit inferior to that of the above-mentioned PTFE.

Accordingly, the present invention aims to improve especially a loading resistance of a contact surface of a rolling sliding part.

DISCLOSURE OF THE INVENTION

The first rolling sliding part of the present invention is in relative rolling contact or sliding contact with a companion member, and is formed on a contact surface thereof with a lubricating film composed of a polymer which contains fluorine with a functional group and in which particles of a polytetrafluoroethylene resin are dispersed and mixed.

The second rolling sliding part of the present invention is in relative rolling contact or sliding contact with a companion member, and is formed on a contact surface thereof with a solid lubricating film composed of a polyurethane high-molecular compound which contains fluorine and in which particles of a polytetrafluoroethylene resin are dispersed and mixed.

The above-mentioned solid lubricating film has a three-dimensional network structure in which molecules are urethane-linked. Further, in the solid lubricating film, a flowable fluorine-containing polymer is dispersed. Although this flowable fluorine-containing polymer is free from a functional group, it is preferably a fluorine-containing polymer such as a functional group-free perfluoropolyether. Still further, the above-mentioned particles are spherical. In this case, the lubricating film is preferably set to have a film thickness which is approximate to the maximum particle diameter of spherical particles.

In the present invention, since particles composed of a polytetrafluoroethylene resin are excellent in not only a lubricating property but also a loading resistance, an ability of the overall lubricating film that withstands a load is increased.

Further, when the lubricating film is a solid one composed of a fluorine-containing polyurethane high-molecular compound, it has a homogeneous structure in which molecules are closely linked, making it possible to continue a lubricating action for a long period of time. Besides, when the fluorine-containing polymer is dispersed in this solid lubricating film in a flowable state, the flowable fluorine-containing polymer flows from the surface of the film, contributing to the lubricating action.

In the present invention, a lubricating film which is excellent in dust generation, a lubricating property and a loading resistance is formed on a contact surface of a rolling sliding part. Accordingly, abrasion caused by rolling and sliding actions when a high load is exerted on a film can be prevented for a long period of time. Thus, it is possible to achieve a long life of a film.

When a lubricating film is a solid film composed of a fluorine-containing polyurethane high-molecular compound, a homogeneous structure is provided in which molecules are intimately linked. As a result, a lubricating action can continue for a long period of time. Besides, when a fluorine-containing polymer is dispersed in this solid lubricating film in a flowable state, this flowable fluorine-containing polymer flows from the surface of the film contributing to a lubricating action. Thus, a lubricating property can be more improved.

BEST MODE FOR CARRYING OUT THE INVENTION

The best mode of the rolling sliding part for carrying out the present invention is described specifically by referring to FIGS. 1 to 6.

Figure 1:
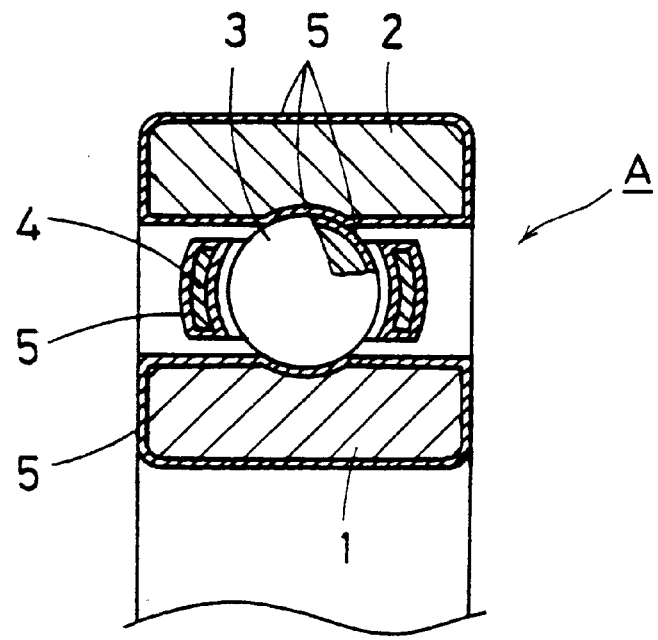
FIG. 1 is a longitudinal sectional view of an upper half of a rolling bearing which is a working example of the present invention.
Figure 2:
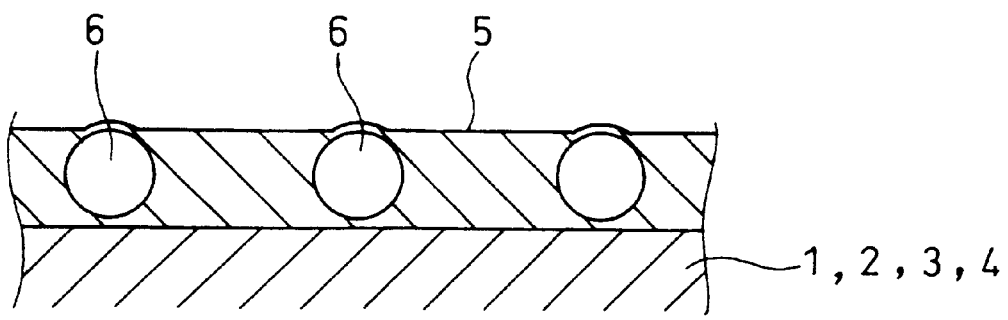
FIG. 2 is an enlarged simplified sectional view of the lubricating film.

FIG. 1 is a longitudinal sectional view of an upper half of a rolling bearing to which the rolling sliding part of the present invention is applied. FIG. 2 is an enlarged simplified sectional view of a lubricating film formed on a contact surface of the rolling bearing in FIG. 1.

In these drawings, the rolling bearing which is called a deep groove ball bearing is an open-type rolling bearing A free from a sealing device. This rolling bearing A is provided with an inner ring 1, an outer ring 2, a spherical rolling element 2 and a crown-type holder 4. A lubricating film 5 is formed on their surfaces.

The inner ring 1 and the outer ring 2 of the rolling bearing A are formed of an anticorrosive member such as a metallic member obtained by subjecting an anticorrosive material such as a martensitic stainless steel according to JIS SUS 440C, for example, a precipitation hardening stainless steel according to JIS SUS 630 to appropriate hardening heat treatment. Further, when the rolling bearing A is used in a light-weight load, the inner ring 1 and the outer ring 2 may be formed of an austenitic stainless steel according to JIS SUS 304.

The rolling element 3 of the rolling bearing A is formed of a ceramic material. In this ceramic material, a substance composed mainly of silicon nitride ($Si_3N_4$) and containing yttria ($Y_2O_3$), alumina ($Al_2O_3$) and optionally aluminum nitride (AlN), titanium oxide ($TiO_2$) and spinel ($MgAl_2O_4$), alumina ($Al_2O_3$), silicon carbide (SiC), zirconia ($ZrO_2$) or aluminum nitride (AlN) can be used as a sintering aid.

The holder 4 of the rolling bearing A is formed of a low carbon steel such as a synthetic resin material or SPCC, or a stainless steel according to JIS SUS 303. Examples of the synthetic resin material include thermoplastic resins having a heat resistance such as a thermoplastic polyimide resin (TPI) containing from 5 to 10% by weight of a polytetrafluoroethylene resin (PTFE) and from 10 to 20% by weight of graphite; fluorine-containing resins such as polytetrafluoroethylene (PTFE) and ethylene tetrafluoroethylene (ETFE); and engineering plastics such as polyether ether ketone (PEEK), polyphenylene sulfide (PPS), polyether sulfone (PES), polyether nitrile (PEN), polyamideimide (PAI) and nylon 46. To these resins, reinforcing fibers such as glass fibers may be added as required. Unless reinforcing fibers are added thereto, the strength is decreased, but fibers exposed which have been worn out on a pocket surface of the holder 4 can be prevented from being bitten in the orbital plane.

In the rolling bearing A having the above-mentioned structure, the lubricating film 5 formed on the surfaces of the inner ring 1, the outer ring 2, the rolling element 3 and the holder 4 is composed of, as shown in FIG. 2, for example, a polymer which contains a fluorine with a functional group and in which particles 6 of a polytetrafluoroethylene (PTFE) resin are dispersed and mixed. As the polymer which contains fluorine with a functional group, a fluoropolyether polymer or a polyfluoroalkyl polymer is preferable. The fluoropolyether polymer has a main structural unit represented by the formula $-C_xF_{2x}-O-$ in which x is an integer of from 1 to 4, and it has a number average molecular weight of from 1,000 to 50,000.

The polyfluoroalkyl polymer is represented by formula (1).

Formula (1):

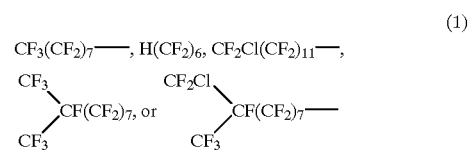

The above-mentioned functional group is preferably one having a high affinity for metal. Examples thereof include an epoxy group, an amino group, a carboxyl group, a hydroxyl group, a mercapto group, a sulfone group and an ester group. Specific examples thereof include those represented by formulas (2).

Formulas (2):

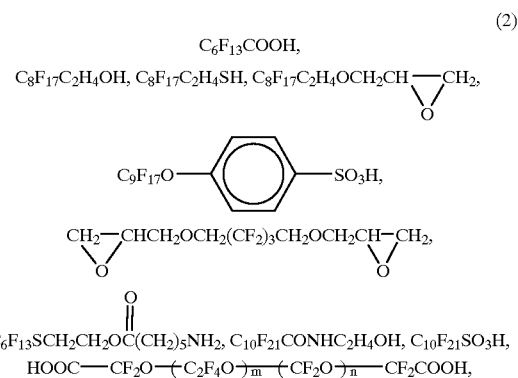

Formula (3):

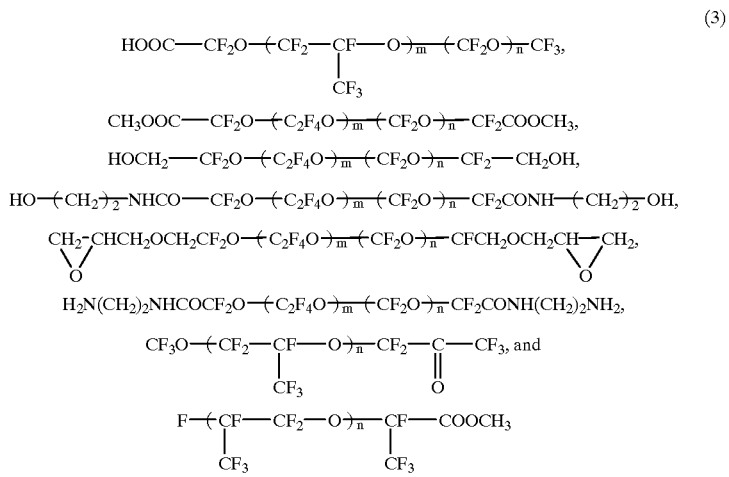

These fluorine-containing polymers may be used either singly or in combination. In this case, it is advisable that for obtaining a film having an excellent abrasion resistance, the groups in combination are reacted with each other to provide a polymer having a higher molecular weight. Further, it is advisable that particles 6 formed of PTFE are spherical. For example, Ceraloop V supplied by Central Glass K.K. is preferable.

As the polymer which contains fluorine with a functional group, a mixture of perfluoropolyether (PFPE) or its derivatives is preferable. Specific examples thereof include Fonblin Y Standard, Fonblin Emulsion (FE20 and EMO4), and Fonblin Z derivatives (Fonblin Z Deal, Fonbrin Z Diac, Fonblin Z Disoc, Fonblin Z Dol, Fonblin Z Doltx 2000, and Fonblin Z Tetraol) supplied by Montecatini. They have a high concentration and exhibit a poor affinity for metal. Therefore, they can hardly be adhered to a film as such. For this reason, it is advisable that they are formed in the following manner. An example of a method of forming the above-mentioned lubricating film 5 is described below.

(a) A solution for obtaining the lubricating film 5 is prepared. The inner ring 1, the outer ring 2, the rolling element 3 and the holder 4 are dipped in the solution separately, or the rolling bearing A which is completed by assembling them is dipped in the solution, and rotated several times to adhere the liquid film to the overall surfaces of the inner ring 1, the outer ring 2, the rolling element 3 and the holder 4 (adhesion treatment). This solution can also be adhered thereto using a spray. The solution prepared here is obtained by diluting, for example, Fonbrin Emulsion $FE_2O$ (containing 20 mass % of Fonbrin) to a Fonbrin concentration of 0.25 mass % with an appropriate diluent, and dispersing and mixing, for example, from 1 to 10% by weight of sperical particles 6 having a particle diameter of from approximately 1 and 2 $\mu$m in the dilute. Examples of the above-mentioned diluent include volatile substances such as a methanol solution, an alcohol solution and water, and a fluorine solvent SV90D as a substitute for flon.

(b) The overall rolling bearing A to which the liquid film has been adhered is heated at from 40 to 50° C. for approximately 3 minutes to remove the solvent contained in the liquid film (drying treatment).

(c) Then, the heating (finish drying treatment) is conducted, for example, at from 100 to 200° C. for from 15 to 30 minutes in consideration of a temperature of an atmosphere in using the bearing. Thus, the lubricating film 5 is obtained which has a flowability and which does not generate an unnecessary dust such as a solvent or an oil component when activating the rolling bearing A.

In this manner, the lubricating film 5 can be formed with a preferable film thickness on the structural elements of the rolling bearing A. By the way, (a) and (b) may be repeated several times as required. Finally, the film thickness of the lubricating film 5 is set at a value approximate to the maximum particle diameter of the particles 6, for example, between approximately 1 and 2 $\mu$m. In the thus-obtained lubricating film 5, as shown in FIG. 2, upper portions of the particles 6 are not exposed, and a part of the lubricating film is also present on the lower portions of the particles 6. Thus, the surface is approximately flat as a whole. The amounts of the particles 6 are determined to occupy from 25 to 50% of the whole area of the lubricating film 5. When the amounts are less than 25% which is the lower limit, it is not so effective for increasing the loading resistance. When the amounts of the particles exceed 50% which is the upper limit, the lubricating property of the fluorine-containing polymer is decreased, and the particles 6 are peeled off, causing dust generation.

In the above-described rolling bearing A, the rolling site and the sliding site of the inner ring 1, the outer ring 2 and the rolling element 3, the sliding site of the holder 4 and the inner ring 1 or the outer ring 2, and the contact site between the rolling element 3 and the holder 4 are brought into contact with one another through the lubricating film 5, and the structural elements of the bearing are not brought into direct contact with one another. Besides, since the lubricating film 5 is itself little worn out or little generates dust by the rolling and sliding actions, the direct contact of the structural elements of the bearing can be avoided for a long period of time, making it possible to achieve a long life thereof. Further, as the cushioning action under loading is increased with the particles 6 of the lubricating film 5, the loading resistance is raised. With respect to the loading resistance, the upper limit of the ability to withstand the load is approximately 150 kgf/mm² in the case of the lubricating film 5 not mixed with the particles 6, whereas it is increased to 200 kgf/mm² in the case of the lubricating film 5 mixed with the particles 6. Especially when the particles 6 are spherical, the load is ispersed widely, and a great cushioning action can be rovided. In this working example, the lubricating film 5 is formed on the whole surfaces of the bearing structural elements. Accordingly, the anticorrosive effect is increased even in the use under an anticorrosive atmosphere, and the anticorrosive treatment can be dispensed with.

The present invention is not limited to the above-mentioned working example, and a variety of applications or modifications are considered.

(1) In the above-mentioned working example, the rolling bearing A such as the deep groove ball bearing is taken up as the rolling sliding part. The type of the rolling bearing is not particularly limited. Further, with respect to the rolling sliding part, the present invention can be applied to the rolling and sliding site such as a ball screw, a direct-acting bearing, and a variety of other mechanical parts.

(2) In the above-mentioned working example, the lubricating film 5 is formed on all of the inner and outer rings 1, 2, the rolling element 3 and the holder 4. However, it is also possible that the lubricating film is formed only on the inner and outer rings 1, 2 or only on the rolling element 3.

Figures 3, 4:
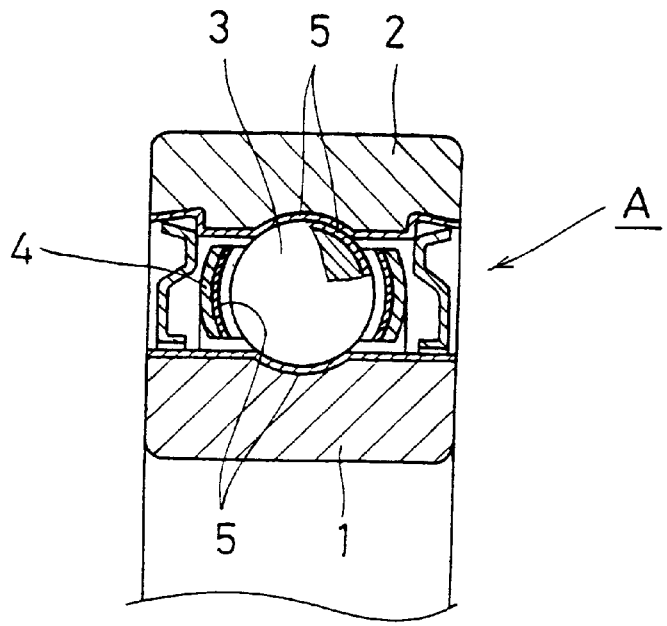
FIG. 3 is a longitudinal sectional view of an upper half of a rolling bearing which is another working example of the present invention.
FIG. 4 is a simplified view of a structure of a solid lubricating film.

(3) In the above-mentioned working example, the lubricating film 5 is formed on all of the inner and outer rings 1, 2, the rolling element 3 and the holder 4. However, as shown in FIG. 3, the lubricating film 5 is formed on the outer peripheral surface of the inner ring 1, the inner peripheral surface of the outer ring 2, the rolling element 3 and the inner surface of the holder 4 (a contact site with the rolling element 3). FIG. 3 shows a type having embedded therein a sealing device. That is, in the inner and outer rings 1, 2, the lubricating film may be formed on the orbital planes of the inner and outer rings 1, 2 and the guide surface of the holder (for example, the shoulder outer peripheral surface of the inner ring 1 in the inner ring guide, and the shoulder inner peripheral surface of the outer ring 2 in the outer ring guide). The lubricating film may be formed on the inner surface or the guide surface (for example, the inner peripheral surface in the inner ring guide, and the outer peripheral surface in the outer ring guide). In this instance, it is considered that the lubricating film is adhered by injecting droplets of the solution prepared between the inner and outer rings 1, 2 of the rolling bearing A in the complete state using a dropping pipette and rotating the inner and outer rings several times, or by masking unnecessary portions, and dipping the individual units of the bearing before assembling in the solution prepared in the above-mentioned (a).

Figure 5:
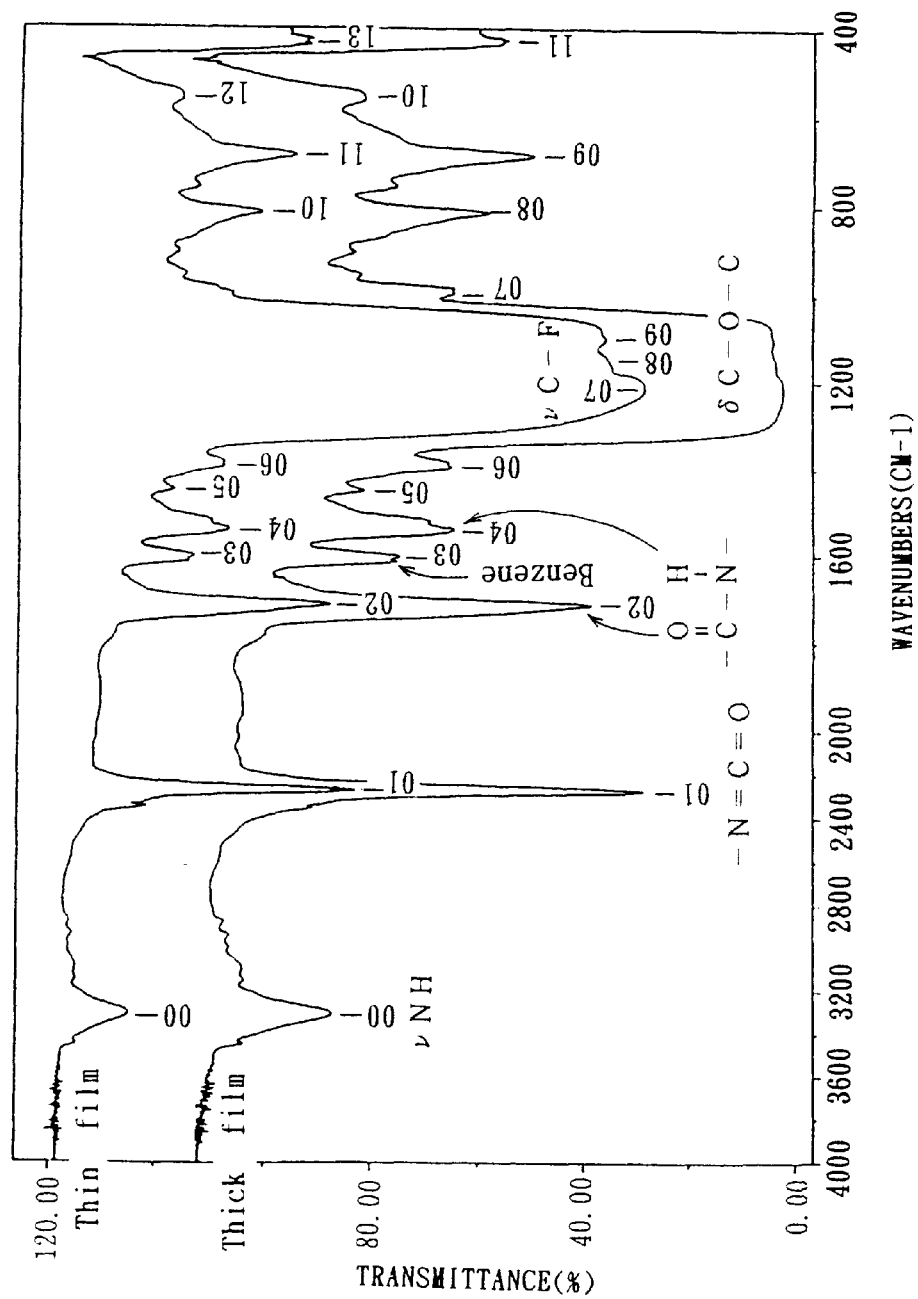
FIG. 5 a graph showing results of analyzing properties of the solid lubricating film before curing.
Figure 6:
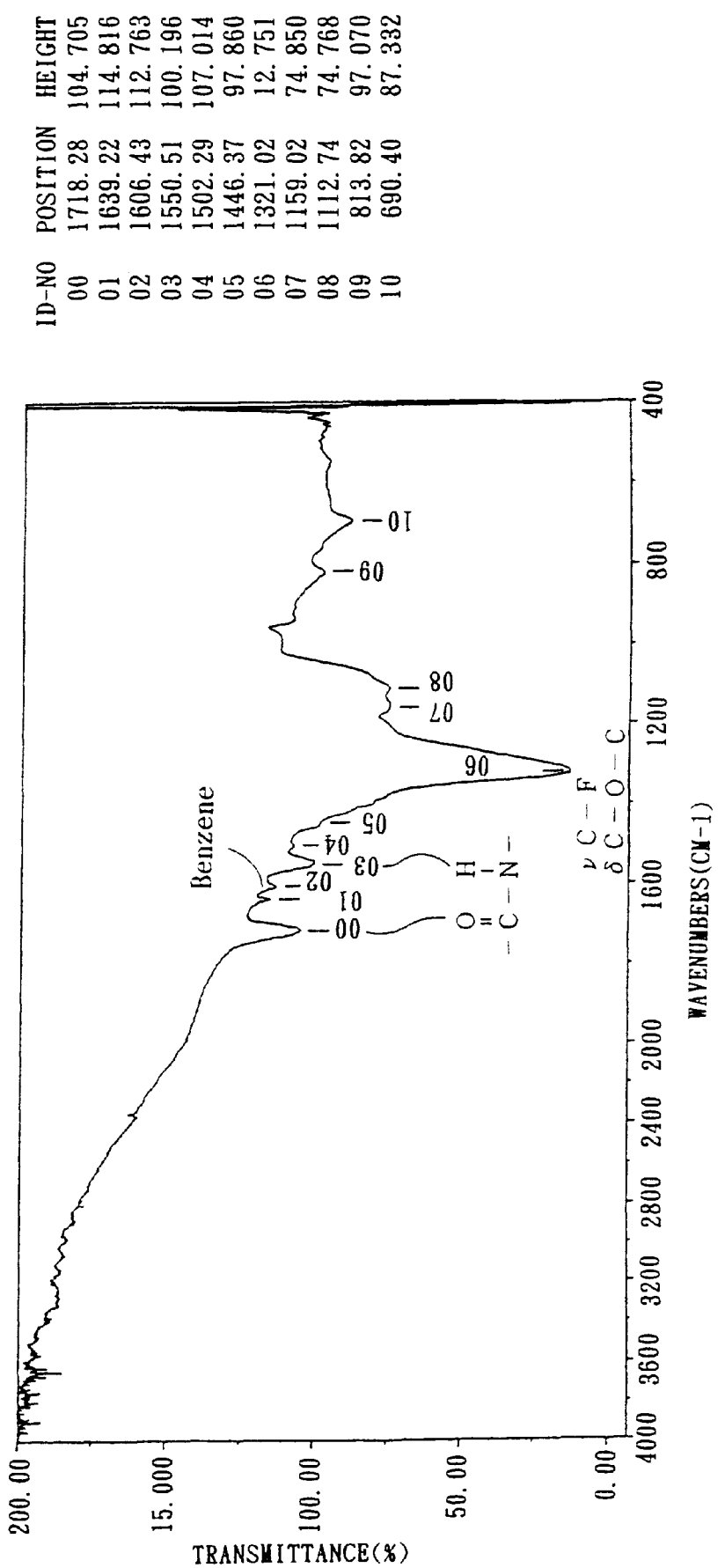
FIG. 6 is a graph showing properties of the solid lubricating film after curing.

(4) In the above-mentioned working example, the lubricating film 5 having the flowability is shown. The following solid lubricating film 5 is also included in the present invention. FIG. 4 is a schematic view of the structure of the solid lubricating film. FIG. 5 is a graph showing results of analyzing properties of the solid lubricating film before curing. FIG. 6 is a graph showing results of analyzing properties of the solid lubricating film after curing.

The above-mentioned solid lubricating film 5 is composed of a polyurethane high-molecular compound which contains fluorine with a functional group and in which particles 6 of a polytetrafluoroethylene resin are dispersed and mixed. The particles 6 are the same as the above-mentioned particles. The fluorine-containing polyurethane high-molecular compound has a main structural unit represented by the formula —$C_xF_{2x}$—O— in which x is an integer of from 1 to 4. The average molecular weight thereof is more than some millions, and this compound has a three-dimensional network structure in which the molecules are urethane-linked through the hardening reaction. The three-dimensional network structure indicates an expression of a chemical structure. It does not mean that the section of the membrane has a network structure, but that the film has a homogeneous structure in which the molecules are continuously linked intimately in the network state. This compound can be obtained by changing a chemical structure of a fluorine-containing polymer with an isocyanate functional group in the end as shown by formula (4).

Formula (4):

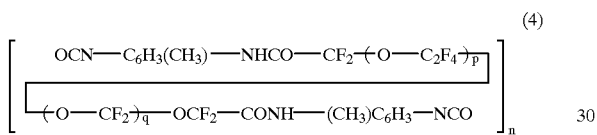

As the above-mentioned fluorine-containing polymer with the isocyanate functional group in the end, perfluoropolyether (PFPE) derivatives are mentioned. Specifically, Fonblin Z derivatives (Fonblin Z Disoc and the like) of Montecatini are preferably used.

A method of forming the above-mentioned solid lubricating film 5 is described below.

(a) A solution for obtaining the slid lubricating film 5 is prepared, and the liquid film is adhered to any necessary sites of the rolling bearing A (adhesion treatment) using this solution. The solution here is prepared by diluting a fluorine-containing polymer with an isocyanate functional group in the end [Fonblin Z derivatives (Fonblin Z Disoc)] with a diluent (fluorine-type solvent SV90D) to a concentration of 1 mass %, and dispersing and mixing therein, for example, 2% by weight of the spherical particles 6 having a diameter of from approximately 1 and 2 $\mu$m.

(b) Only the portions to which the liquid film has been adhered or the overall rolling bearing A is heated at from 40 to 50° C. for approximately 1 minute to remove the solvent contained in the liquid film (drying treatment). At this time, the film remains liquid and has a flowability.

(c) Thereafter, the film is heated, for example, at from 100 to 200° C. for 20 hours (curing treatment). Accordingly, the chemical structure of the liquid film is changed to conduct the curing reaction, and the solid lubricating film 5 is then obtained. In this curing treatment, through the four curing reactions as schematically shown by formulas (4) to (7), the terminal isocyanate (NCO) in the fluorine-containing polymers with the functional groups which are present in the liquid film disappears, and the fluorine-containing polymers with the functional groups are urethane-linked with one another to provide a three-dimensional network structure. In the urethane-linking, the polymers are linearly crosslinked as schematically shown in FIG. 4(*a*) through the curing reaction as schematically shown by formulas (4) and; the polymers are three-dimensionally crosslinked as schematically shown in FIG. 4(*b*) through the curing reaction as schematically shown by formulas (6) and (7). FIG. 4 simplifies the above-mentioned formula 4 as indicated in formula (8).

Formula (5):

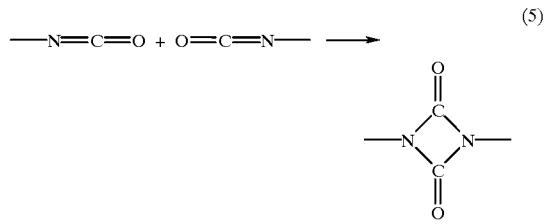

Formula (6):

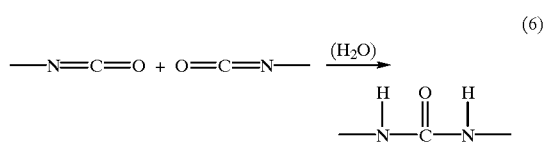

Formula (7):

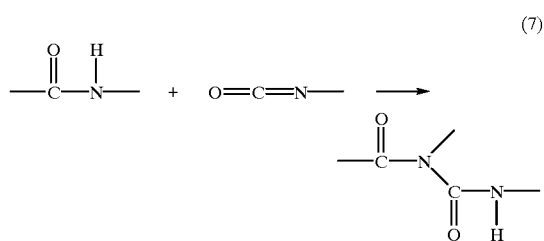

Formula (8):

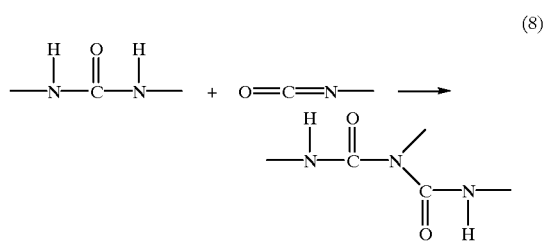

Formula (9):

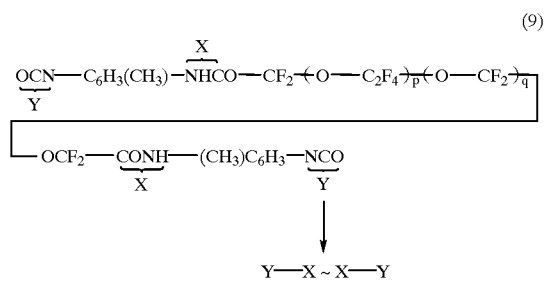

In this manner, the solid lubricating film 5 can be formed to an appropriate film thickness on necessary sites of the rolling bearing A. Incidentally, (a) and (b) may be repeated several times as required. Finally, the film thickness of the lubricating film 5 can be set within the range of, for example, from 1 to 2 μm as required.

The thus-obtained solid lubricating film 5 has, like the above-mentioned lubricating film having the flowability, a film thickness approximate to the diameter of the particles 6, as shown in FIG. 2, the upper portions of the particles 6 are not exposed, and a part of the lubricating film 5 is present on the lower portions of the particles 6. Thus, the surface is approximately flat as a whole. Further, this solid lubricating film 5 contains 3% by weight of the solid component of perfluoropolyether (PFPE), 0.75% by weight of the liquid component and 2% by weight of a polytetrafluoroethylene resin (PTFE).

The state of the solution prepared in (a) which is only concentrated and dried (flowable state) and the state of the solution prepared in (a) which has been cured by being adhered to a sample such as a stainless steel plate are analyzed as described below.

The former is analyzed by a FT-IR method (Fourier transform infrared spectrophotometry, liquid film method). Consequently, as shown in a graph of FIG. 5, it can be identified that peaks of NH (3,300 cm$^{-1}$), N=C=O (2,279 cm$^{-1}$), N(H)C=O (1,712 cm$^{-1}$, 1,546 cm$^{-1}$) and benzene (1,600 cm$^{-1}$), besides a fluorine-based peak, are observed, and a benzene ring, a urethane linkage and an isocyanate are present as functional groups. In this case, the thin film and the thick film are examined. However, the analysis is conducted irrespective of the film thickness. The latter is analyzed by a FT-IR method (Fourier transform infrared spectrophotometry, high-sensitivity reflection method). Consequently, as shown in a graph of FIG. 6, peaks of a benzene ring and a urethane linkage are observed, but no peak of isocyanate is observed. That is, the change in the chemical structure owing to the curing reactions shown in formulas (4) to (7) is identified on the basis of these results.

The above-described solid lubricating film 5 has itself the three-dimensional network structure, and is intimately coated on portions to be coated and has a self-lubricating property. Therefore, excellent rolling characteristics can be exhibited for a longer period of time than in the above-mentioned working examples. Further, the loading resistance is the same as that in the above-mentioned working examples. Still further, since the lubricating film 5 itself and the particles 6 are fluorine-based, they provide for a good compatibility therebetween, and the particles 6 are hardly peeled off from the lubricating film 5.

In the above-mentioned working examples, the energy of electromagnetic waves (light) such as ultraviolet rays, infrared rays, γ-rays and electron rays can be used in place of the heating. The drying treatment (b) may be omitted.

The solid lubricating film 5 can also have a structure that a fluorine-containing polymer such as fluoropolyether is dispersed in a flucrine-containing polyurethane high-molecular compound In a flowable state. In this case, in the adhesion treatment of the above-mentioned method (a), the solution may be prepared by mixing a fluorine-containing polymer having an isocyanate functional group in the end (for examples, Fonblin Z derivatives such as Fonblin Z Disoc and the like) with a fluorine-containing polymer free from a functional group (for example, Fonblin Z derivatives such as Fonblin Z-60 and the like) at a predetermined ratio. In this case, in the curing treatment (c), the fluorine-containing polymer free from the functional group is not bound to the fluorine-containing polymer having the functional group, and it becomes flowable inside the solid lubricating film 5 and flows from the surface of the film, exhibiting the lubricating action. The fluorine-containing polymer is not limited to the above-mentioned fluorine-containing polymer free from the functional group. Fluorine-containing polymers having the functional group as represented by formulas 10, 11 and 12 are also available.

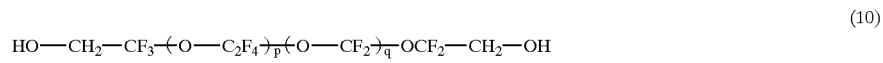
(10)

(11)

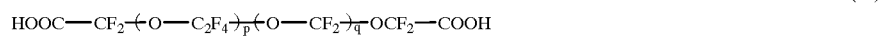
(12)

What is claimed is:

1. A rolling sliding part, which is formed of a metallic member or a ceramic material and which is in relative rolling contact or sliding contact with a companion member, said rolling sliding part having on a surface thereof a lubricating film which is composed of a polymer which contains fluorine with a functional group and in which particles of a polytetrafluoroethylene resin are dispersed and mixed, said polymer having a main structure unit represented by the formula —$C_xF_{2x}$—O— in which x is an integer of from 1 to 4, said lubricating film being formed in a solid state through curing treatment.

2. A rolling sliding part which is formed of a metallic member or ceramic material and which is in relative rolling contact or sliding contact with a companion member, said rolling sliding part having on a surface thereof a lubricating film composed of a polyurethane high-molecular compound which contains fluorine and in which particles of a polytetrafluoroethylene resin are dispersed and mixed, said polyurethane compound having a main structure unit represented by the formula —$C_xF_{2x}$—O— in which x is an integer of from 1 to 4 and having a three dimensional network structure, said lubricating film being formed in a solid state through curing treatment.

3. The rolling sliding part of claim 2, wherein the solid lubricating film has a three-dimensional network structure in which molecules are urethane-bond.

4. The rolling sliding part of claim 2, wherein the solid lubricating film has dispersed therein a fluorine-containing polymer having a flowability.

5. The rolling sliding part of claim 4, wherein the fluorine-containing polymer having the flowability is free from a functional group.

6. The rolling sliding part of claim 1, wherein the particles are spherical.

7. The rolling sliding part of claim 6, wherein the lubricating film has a film thickness approximate to the maximum particle diameter of the spherical particles.

8. The rolling sliding part of claim 3, wherein the solid lubricating film has dispersed therein a fluorine-containing polymer having a flowability.

9. The rolling sliding part of claim 2, wherein the particles are spherical.

10. The rolling sliding part of claim 1, said rolling sliding part is one selected from the group consisting of a rolling bearing, a ball screw and a direct-acting bearing.

11. The rolling sliding part of claim 2, said rolling sliding part is one selected from the group consisting of a rolling bearing, a ball screw and a direct-acting bearing.

* * * * *